(12) United States Patent
Marseille et al.

(10) Patent No.: US 8,794,535 B2
(45) Date of Patent: Aug. 5, 2014

(54) BANK CARD WITH DISPLAY SCREEN

(75) Inventors: Francois-Xavier Marseille, Marly le Roi (FR); Pierre Gravez, Nogent sur Marne (FR); Michel Thill, Les Clayes-sous-Bois (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 13/701,095

(22) PCT Filed: May 31, 2011

(86) PCT No.: PCT/EP2011/058914
§ 371 (c)(1),
(2), (4) Date: Nov. 30, 2012

(87) PCT Pub. No.: WO2011/151309
PCT Pub. Date: Dec. 8, 2011

(65) Prior Publication Data
US 2013/0087627 A1 Apr. 11, 2013

(30) Foreign Application Priority Data

May 31, 2010 (EP) .................................. 10305571

(51) Int. Cl.
*G06K 19/06* (2006.01)
(52) U.S. Cl.
USPC .......................................... 235/492; 235/380
(58) Field of Classification Search
USPC .................. 235/449, 493, 492, 451, 380, 441
See application file for complete search history.

(56) References Cited

U.S. PATENT DOCUMENTS

| | | | | |
|---|---|---|---|---|
| 6,168,083 B1 * | 1/2001 | Berger et al. | ................ | 235/492 |
| 6,776,332 B2 | 8/2004 | Allen et al. | | |
| 7,762,471 B2 * | 7/2010 | Tanner | ........................ | 235/492 |
| 2002/0179707 A1 * | 12/2002 | Omet | ............................ | 235/451 |
| 2004/0124246 A1 | 7/2004 | Allen et al. | | |
| 2005/0247777 A1 * | 11/2005 | Pitroda | ......................... | 235/380 |
| 2007/0290049 A1 | 12/2007 | Ratcliffe | | |
| 2008/0093452 A1 * | 4/2008 | Will et al. | ..................... | 235/441 |
| 2008/0105751 A1 * | 5/2008 | Landau | ........................ | 235/492 |

(Continued)

FOREIGN PATENT DOCUMENTS

| | | |
|---|---|---|
| FR | 2725084 A1 | 3/1996 |
| WO | WO0201496 A1 | 1/2002 |

(Continued)

OTHER PUBLICATIONS

PCT/EP2011/058914 International Search Report, Jun. 21, 2011, European Patent Office, P.B. 5818 Patentlaan 2, NL—2280 HV Rijswijk.

(Continued)

*Primary Examiner* — Thien M Le
(74) *Attorney, Agent, or Firm* — The Jansson Firm; Pehr B Jansson

(57) ABSTRACT

In order to allow a display of the latest transactions, a smart card 100c for secure transactions comprises at least one secure chip 101c, for example of the EMV type, with at least one communication interface to communicate with a card reader in order to carry out a transaction, an electronic display 103, an independent battery 104, a card reader circuit 150c connected to a communication interface of the secure chip in order to access the information contained in the secure chip to be able to display it on the display.

13 Claims, 2 Drawing Sheets

(56) References Cited

U.S. PATENT DOCUMENTS

2009/0240625 A1 9/2009 Faith et al.
2010/0224685 A1* 9/2010 Aoki ............................ 235/488
2011/0140841 A1* 6/2011 Bona et al. .................. 340/5.83

FOREIGN PATENT DOCUMENTS

| WO | WO2008104567 A1 | 9/2008 |
| WO | WO2010022129 A1 | 2/2010 |
| WO | WO2011151366 A1 | 12/2011 |

OTHER PUBLICATIONS

PCT/EP2011/059021 International Search Report, Sep. 12, 2011, European Patent Office, P.B. 5818 Patentlaan 2 NL—2280 HV Rijswijk.

* cited by examiner

BANK CARD WITH DISPLAY SCREEN

BACKGROUND OF THE INVENTION

Bank cards have electronic chips for transaction security. The EMV standard was created by Europay, MasterCard and Visa, the initials of which relate to the definition of an interoperability and security standard between smart bank cards. For a card to have EMV certification, it must have a chip, which is itself certified and has a contact type interface according to the standard ISO 7816 and/or a contactless interface according to the standard ISO 14443. To limit the risks of hacking, EMV chips do not have any other communication interface.

Besides, the making of smart cards with a screen and one or more pushbuttons to communicate with the cardholder is also known. These cards are not currently widespread and are used for generating single-use passwords for computer transactions. Such cards generally have a chip with a contact or contactless smart card communication interface and a communication port designed for communication with other integrated circuits such as for example an I2C communication interface or General Purpose Input/Output (GPIO) ports. It is thus possible for a smart card microcontroller to communicate with a display controller that controls a liquid crystal display or a so-called "electronic ink" display.

One idea would be to make a bank card with a screen to display the latest transactions completed. That raises a problem if the smart card is to be made according to the EMV standard. These chips do not have an additional input/output port for such an application, and for security reasons, the addition of other input/output ports is not preferable.

As a result, it is not possible to steer the display from an EMV chip. A solution is thus required to be able to display the latest transactions completed on a smart card.

SUMMARY

The invention is a solution to the problem posed. To allow the display of the latest transactions, a second microcontroller is added to the smart card in order to provide a card reader function to read the data relating to the latest transactions completed from the EMV chip.

More particularly, the invention is a smart card for secure transactions comprising at least one secure chip with a communication interface in order to communicate with a card reader in order to carry out a transaction. That card further comprises an electronic display, an independent battery and a card reader circuit connected to the communication interface of the secure chip in order to be able to access the information contained in the secure chip so as to be able to display it on the display.

Preferentially, the reader circuit only accesses public information of the secure chip. Public information includes the amounts of the transactions completed.

Further, the card may comprise an actuator to allow a holder of the said card to trigger reading and display the information read. That actuator may be a motion sensor.

In one alternative, the card may comprise a usage sensor to inhibit or allow the working of the reader circuit. The usage sensor may be a light sensor.

According to different embodiments, the communication interface may be a contact type interface in which the reader circuit is connected in parallel to the contacts of the card through controlled switches and/or the communication interface may be a contactless interface with a first antenna formed of turns inside the card and in which the reader circuit has a second antenna formed of turns inside the card, the first and the second antenna sharing a common electromagnetic flux. If the card has a contactless interface, the communication interface can disable the working of the card reader circuit if an external field is detected. If the secure chip has two communication interfaces, then at least one communication interface is connected to the reader circuit.

BRIEF DESCRIPTION OF THE DRAWINGS

The invention will be better understood and other particularities and benefits will become clear in the description below, which refers to the attached drawings, among which

DETAILED DESCRIPTION

Figure 1:
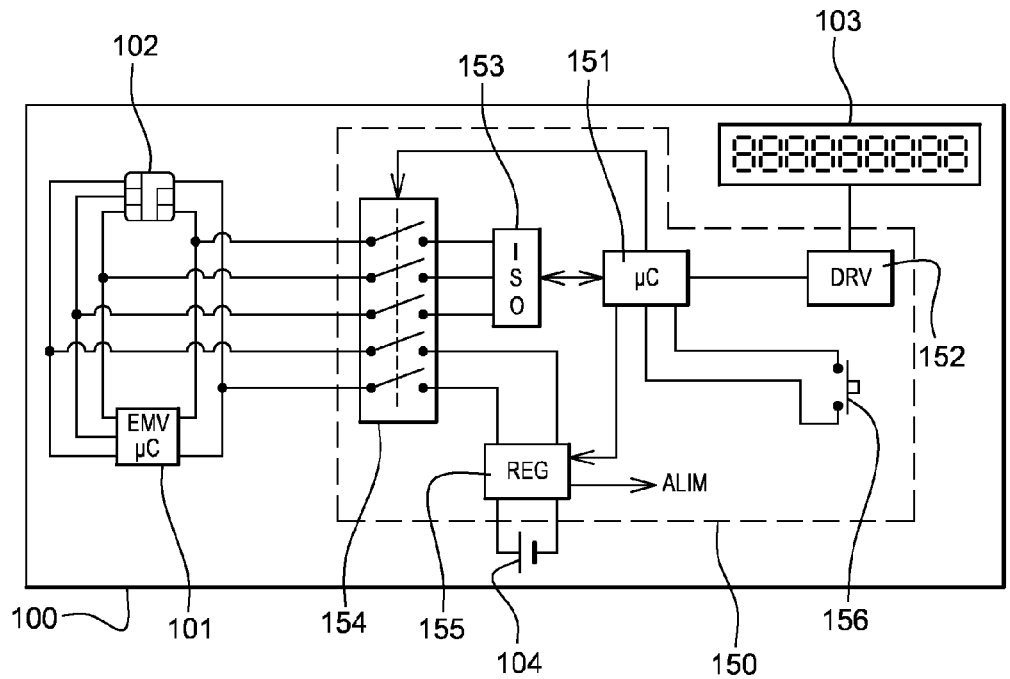
FIGS. 1 to 3 represent three embodiments of the invention.

FIG. 1 is a functional chart of a first embodiment of the invention. In this embodiment, the bank card 100 is a contact type smart card comprising a secure chip 101 with a communication interface in accordance with the standard ISO 7816 connected to a connector 102 comprising contact pads that are also defined by the standard 7816. The secure chip 101 is for example a chip that meets the EMV standard and comprises restricted-access data and other so-called public data. The restricted-access data require the use of a password or encrypted messages whereas public data may be accessed for reading and/or writing by any reader that complies with the standard ISO 7816.

During a payment that uses the secure chip 101, the bank card 100 is inserted in a secure reader which verifies a PIN number entered by the holder of the card to verify that the card holder is the right one, followed by the exchange of secure information via encrypted messages between the card, the reader and possibly a remote server to verify if the card debit is or is not authorised. When the transaction is completed, the information is updated in the card and the reader to indicate the amount of the transaction completed and possibly the balance remaining in the card. The completed transaction amounts that are stored in the card have no legal value and do not contain confidential information, and are thus generally saved in a non-secure memory zone, which is thus accessible by any type of reader that complies with the standard ISO 7816.

In order to display the latest transactions completed, the bank card 100 has an electronic display 103, a battery 104 and a card reader circuit 150. The card reader circuit 150 may be made of a single integrated circuit or possibly several circuits. In terms of manufacturing, the reader circuit 150 may be laminated on a substrate in the card body using a known method with contact with the rear side of the contact pads of the connector 102 according to a known technique.

The electronic display 103 may be of the liquid crystal type or the electronic-ink type using micro-balls. What matters is that the electronic display 103 must be sufficiently fine to be integrated into a smart card and must also have low power requirements. The battery 104 is an ultra-flat battery that can be integrated into a smart card. Depending on the required life of the card and the consumption of the reader circuit 150 and the electronic display 103, a rechargeable or non-rechargeable battery may be chosen.

The card reader circuit 150 comprises a microcontroller 151 constituting the intelligence of the device and comprising the programs required for the working of the whole, a steering circuit 152 to control the electronic display 103, a communication interface 153 in accordance with the standard ISO 7816 but on the reader side, a switching circuit 154 placed between the interface 153 and the secure chip, a power supply regulator 155 and a pushbutton 156.

The microcontroller 151 is the main control component of the card reader circuit. The steering circuit 152 is used for transforming a number to write supplied by the microcontroller 151 into electronic signals to control the electronic display 103. The power supply regulator 155 is used for transforming the voltage supplied by the battery into power voltage for the 20 display electronic 103, the reader circuit 150 and also the secure chip when the reader circuit reads the card. The power supply regulator 155 may also act as a battery charger if the battery 104 is of the rechargeable type. The battery is recharged when the card is connected to an external reader during a transaction. In that case, the regulator must not be connected directly to the 25 power supply contact pads without going through the switch circuit 154.

The pushbutton 156 is an actuator accessible by the card holder to trigger the working of the card reader. Typically, following an action on the pushbutton 156, the microcontroller 151 acts on the switching circuit 154 to connect the secure chip to the interface 153 and the power supply regulator 155, so that the battery 104 powers the secure chip 101. The microcontroller 151 will then control the interface 153 to initiate communication with the secure chip 101 and read the amount of the last transaction completed. Once the data are read, the microcontroller 153 sends a control sequence to the steering circuit 152 to display the amount on the electronic display 103.

Pressing the pushbutton 156 once again can lead to the readout and display of the previous transaction. Keeping the button pressed down can stop the reading of transactions and switch to standby mode, where the power supply of the secure chip 101, the display 103, the interface 153 and the steering circuit is switched off and where only the microcontroller 151 is powered for the part allowing the device to wake up when the pushbutton is pressed once again. If the pushbutton 156 is not pressed for a predefined long time, such as for example 1 to 2 minutes, that puts the system into standby.

As an alternative, it is also possible that the first action on the pushbutton 156 triggers a series of readings of all the transactions accessible in the secure chip 101. The microcontroller 151 then stores the transaction information locally. When the pushbutton 156 is pressed once again, the microcontroller 151 merely displays the previous transactions that have already been read.

Figure 2:
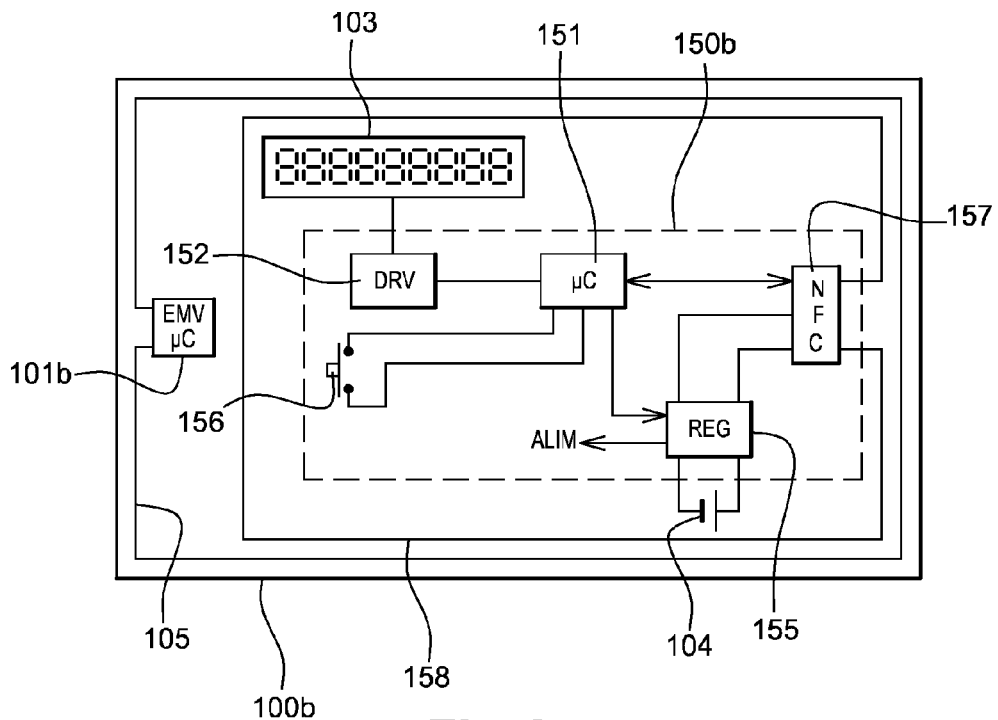

FIG. 2 is a functional chart of a second embodiment of the invention. In order to simplify the description, the components that are shared between the first and second embodiments have the same references and will not be described further. Also, the equivalent components will have a reference that also refers to the first embodiment by adding a 'b'.

In this second embodiment, the bank card 100b is a contactless type smart card comprising a secure chip 101b with a communication interface in accordance with the standard ISO 14443 connected to an antenna 105 made up of turns placed inside the card body. The secure chip 101b is for example a chip that meets the EMV standard and comprises restricted-access data and other so-called public data. The restricted-access data require the use of passwords or encrypted messages whereas public data may be accessed for reading and/or writing by any reader that complies with the standard ISO 14443.

During a payment that uses the secure chip 101b, the bank card 100b is placed before the antenna of a secure reader and secure information is exchanged via encrypted messages between the card, the reader and possibly a remote server to verify if the card debit is or is not authorised. When the transaction is completed, the information is updated in the card and the reader to indicate the amount of the transaction completed and possibly the balance remaining in the card. The completed transaction amounts that are stored in the card have no legal value and do not contain confidential information, and are thus generally saved in a non-secure memory zone, which is thus accessible by any type of reader that complies with the standard ISO 14443.

In order to display the latest transactions completed, the bank card 100b has an electronic display 103, a battery 104 and a card reader circuit 150b. The card reader circuit 150b differs from the first embodiment in that it uses a communication interface 157 that complies with the standard ISO 14443, connected to an antenna 158. The antenna 158 is an antenna made up of several turns and is also placed inside the card body. The antennas 105 and 158 are made so as to share common electromagnetic flux in order to allow the secure chip 101b to be powered by antenna coupling and communication between the secure chip 101b and the interface 157. These two antennas are further configured to not disturb each other when they share the electromagnetic flux of a reader located outside the card.

The interface 157 also makes it possible to recover energy from an external reader in order to make it possible to recharge the battery 104 by means of a power supply regulator 104. Further, the interface 157 makes it possible to detect an external field created by another reader and can inhibit the working of the card reader circuit 150b in case of detection, in order to avoid disturbing a transaction.

Figure 3:
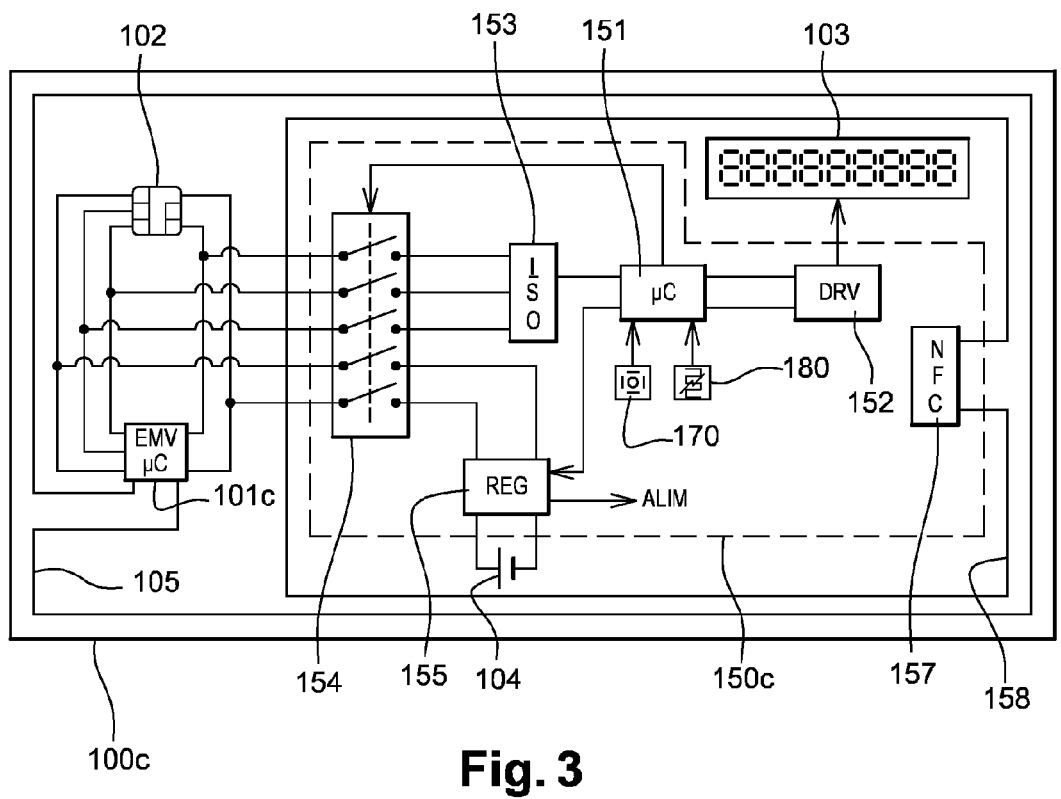

FIG. 3 represents a functional diagram of a third embodiment of the invention, which further incorporates improvements that can also be used in combination with one of the embodiments described above. In order to simplify the description, the components that are shared between the second and third embodiments have the same references and will not be described further. Also, the equivalent components will have a reference that also refers to the other embodiments by adding a 'c'.

In this third embodiment, the bank card 100c is a hybrid smart card comprising a secure chip 101c with a communication interface in accordance with the standard ISO 7816 connected to a connector 102 comprising contact pads that are also defined by the standard ISO 7816 and also a communication interface in accordance with the standard ISO 14443 connected to an antenna 105 made up of turns placed inside the card body. The secure chip 101c is for example a chip that meets the EMV standard and comprises restricted-access data and other so-called public data. The restricted-access data require the use of a password or encrypted messages whereas public data may be accessed for reading and/or writing by any reader that complies with the standard ISO 7816 or the standard ISO 14443.

In order to display the latest transactions completed, the bank card 100c has an electronic display 103, a battery 104 and a card reader circuit 150c. The card reader circuit 150c differs from the two previous embodiments in that it uses both a communication interface 153 that complies with the standard ISO 7816 and a switching circuit 154 placed between the interface 153 and the secure chip and a communication interface 157 that complies with the standard ISO 14443 and is connected to an antenna 158. In practice, only one interface 153 or 157 is sufficient if the secure chip 101c has registers accessible regardless of the type of communication interface used.

Among the other changes, the pushbutton 156 is replaced by an accelerometer 170 in order to avoid problems relating to wear and tear and loose contacts associated with pushbuttons, which are particularly sensitive on smart cards. Thus, the reader can be powered up in a movement for card reading, and movement signatures can be used to differentiate whether a particular type of transaction is to be viewed.

Also, the use of a pushbutton or even an accelerometer can start up the reader circuit when the card is already in a reader. Such double access can lead to problems. In order to remedy possible problems, a light sensor 180 is used and coupled with the microcontroller 151 to not power the secure chip 101c by the battery 104 and block all card communication if the sensor does not sense sufficient light. That further prevents discharging the battery by unintentional activation in a pocket subject to pressure.

The invention claimed is:

1. A smart card for secure transactions comprising inside smart card body:
   at least one secure chip comprising:
      a communication interface in order to communicate with a card reader external to the smart card so as to carry out a transaction; and
      information stored in a memory of the secure chip;
   a card reader circuit connected to the secure chip via a switching circuit connected between the communications interface of the secure chip and a processor of the card reader circuit wherein the card reader circuit communicates with the secure chip using the same communications protocol as the reader external to the smart card uses to communicate with the secure chip; and
   an electronic display connected to the card reader circuit; and an independent battery; wherein
   the switching circuit allows communication between the communications interface of the secure chip and the processor of the card reader circuit in order to allow the card reader circuit access to the information stored in the memory of the secure chip so as to be able to display the information on the electronic display when the switches are closed.

2. The card according to claim 1, wherein the reader circuit only accesses public information of the secure chip.

3. The card according to claim 2, wherein the public information includes the amounts of the transactions completed.

4. The card according to claim 1, wherein the card comprises an actuator to allow a holder of the said card to trigger reading and display the information read.

5. The card according to claim 4, wherein the actuator is a motion sensor.

6. The card according to claim 1, wherein the card comprises a usage sensor to inhibit or enable the working of the reader circuit.

7. The card according to claim 6, wherein the usage sensor is a light sensor.

8. The card according to claim 1, wherein the communication interface is a contact type interface and wherein the internal card reader circuit is connected in parallel to the contacts of the card.

9. The card according to claim 1, wherein the communication interface is a contactless interface with a first antenna formed of turns inside the card and wherein the reader circuit has a second antenna formed of turns inside the card, the first and the second antenna sharing a common electromagnetic flux.

10. The card according to claim 9, wherein the communication interface disables the working of the card reader circuit if an external field is detected.

11. The card according to claim 1, wherein the secure chip has two communication interfaces, and wherein at least one communication interface is connected to the reader circuit.

12. The card according to claim 1, wherein the communication interface of the secure chip is a communication interface according to ISO7816 standard and/or ISO14443 standard and wherein the card reader circuit is a reader according to ISO7816 standard and/or ISO14443 standard.

13. The card according to claim 1 comprising an activation device connected to the processor of the card reader circuit and wherein the processor is operable to close the switches in response to an activation signal from the activation device.

\* \* \* \* \*